United States Patent [19]

Czech

[11] Patent Number: 5,466,529
[45] Date of Patent: Nov. 14, 1995

[54] POLYSILOXANES HAVING ANIONIC CARBOXY, PHOSPHONIC OR CARBOXY AND SULFONATE GROUPS USEFUL AS AN ANTISTAIN FINISH FOR NYLON

[75] Inventor: Anna M. Czech, Peekskill, N.Y.

[73] Assignee: OSi Specialties, Inc., Danbury, Conn.

[21] Appl. No.: 71,293

[22] Filed: Jun. 2, 1993

Related U.S. Application Data

[63] Continuation-in-part of Ser. No. 953,017, Sep. 29, 1992, abandoned.

[51] Int. Cl.[6] .............................. B32B 27/34; B32B 9/04
[52] U.S. Cl. ..................... 428/395; 428/447; 524/588; 528/25; 528/26
[58] Field of Search .................... 428/447, 395; 528/25, 26; 524/588

[56] References Cited

U.S. PATENT DOCUMENTS

| | | | |
|---|---|---|---|
| 2,957,899 | 10/1960 | Black et al. | 260/448.2 |
| 4,501,591 | 2/1985 | Ucci et al. | 8/495 |
| 4,677,178 | 6/1987 | Okada et al. | 528/34 |
| 4,680,212 | 7/1987 | Blyth et al. | 428/97 |
| 4,717,498 | 1/1988 | Maxon | 252/174.15 |
| 4,777,277 | 10/1988 | Colas et al. | 556/419 |
| 4,822,373 | 4/1989 | Olson et al. | 8/115.6 |
| 4,925,707 | 5/1990 | Vinod | 427/393.4 |
| 4,937,123 | 6/1990 | Chang et al. | 428/96 |
| 4,987,180 | 1/1991 | Ohata et al. | 528/26 |
| 5,001,004 | 3/1991 | Fitzgerald et al. | 428/263 |

OTHER PUBLICATIONS

108:188933g The Surface and Foam–Forming Activity of Sulfo Derivatives of Organosilicon Maleates. Kolloidn. Zh. 1988, 50(1), 135–8 (Russ.) Gol'din, et al.

Gol'din, G. S., et al. Salts of Organosilicon Esters of Sulfosuccinic Acid. Translated from Zhurnal Prikladnoi Khimii, vol. 52, No. 6, pp. 1346–1352, Jun., 1979.

Gol'din, G. S. et al. Sulfosuccinate Esters of (Polysiloxanylene) Bispropanols and Investigation of Their . . . Trans. from Zhurnal Prikladnoi Khimii, vol. 41, No. 4, pp. 879–883, Apr., 1978.

*Primary Examiner*—John C. Bleutde
*Assistant Examiner*—Mark D. Sweet
*Attorney, Agent, or Firm*—Andrew S. Reiskind

[57] ABSTRACT

A method is provided to impart stain resistance to a polyamide substrate, which method comprises contacting the substrate with an anionic polysiloxane selected from the group consisting of (A) a polysiloxane having at least one carboxy group, (B) a polysiloxane having at least one phosphonic acid group or a phosphonic salt group, (C) a polysiloxane having at least one carboxy group and at least one sulfonate group, and (D) a mixture of at least two of polysiloxanes (A), (B) and (C).

4 Claims, No Drawings

POLYSILOXANES HAVING ANIONIC CARBOXY, PHOSPHONIC OR CARBOXY AND SULFONATE GROUPS USEFUL AS AN ANTISTAIN FINISH FOR NYLON

This application is a continuation-in-part of prior U.S. application Ser. No. 07/953,017 filed Sep. 29, 1992, now abandoned.

BACKGROUND OF THE INVENTION

1. Field of the Invention

The present invention relates to a stain repellent finish which protects a polyamide substrate from staining. More particularly, the present invention relates to a method for protecting a polyamide substrate, such as nylon, from anionic stains, which method involves applying polysiloxanes having carboxy, phosphonic, or carboxy and sulfonate functional groups to impart repellency to anionic stains.

2. Prior Art

In general, three basic types of organic antistain finishes are known in the art. The first type is an aqueous solution of condensates of formaldehyde with phenolsulfonic acids, napthosulfonic acids, and sulfonates of dihydroxydiphenylsulphones of low molecular weight ranging from about 250 to 700. These organic antistain finishes also known as "sulfonated novolak resins" are described in U.S. Pat. Nos. 4,501,591 and 4,680,212. However, these finishes have a tendency themselves to yellow, and, hence, to discolor a textile substrate such as a carpet.

A second type of organic antistain finish is represented by an aqueous solution of a sulfonated aromatic polymer or copolymer, such as a copolymer of maleic anhydride and an ethylenically unsaturated monomer, such as styrene, subsequently sulfonated to impart stain resistance to carpet and upholstery. Included in this second type is a physical blend of sulfonated novolak resin and a polymer of methacrylic acid. When a physical blend is employed the individual components are applied successively or together in an aqueous treating solution. This second type of organic antistain finish is disclosed in U.S. Pat. Nos. 5,001,004; 4,822,373; and 4,925,707. As a mixture of an aromatic and aliphatic components, this second type of antistain suffers less yellowing than the first type of antistain which primarily consists of aromatic components.

A third type of organic antistain finish known in the art is represented by aqueous solutions of polymers of methacrylic acid and copolymers of polymethacrylic acid free of aromatic components. Examples of such antistains are described in U.S. Pat. No. 4,937,123.

There is an on-going need for an antistain finish or treatment for polyamide substrates, such as nylon carpet and upholstery.

Silicones are not known to be used as antistain finishes for polyamide substrates. Although anionic silicone copolymers are employed in personal care applications such as in U.S. Pat. No. 4,717,498 and as emulsifiers and foaming agents in U.S. Pat. No. 4,777,277, they have not been recognized as effective antistain finishes for a polyamide substrate.

SUMMARY OF THE INVENTION

Accordingly, the present invention provides a method for imparting resistance to anionic or acidic stains such as fruit juices and anionic colorants such as FD&C Red Dye No. 40 and the like. The method of the present invention comprises contacting a polyamide substrate with a polysiloxane selected from the group consisting of (A) a polysiloxane having at least one carboxy group, (B) a polysiloxane having a phosphonic acid group or a phosphonic salt group, (C) a polysiloxane having at least one carboxy group and at least one sulfonate group, and (D) a mixture of at least two of polysiloxanes (A), (B), and (C).

DETAILED DESCRIPTION OF THE INVENTION

Polyamide Substrate

Substrates suitable for use in the present invention are fibrous, woven and nonwoven, polyamides such as nylon 6, nylon 6,6, wool, and silk, and polyamide blends with other natural fibers such as flax and cotton and blends with synthetic fibers such as polyester, polyolefins such as polypropylene and the like, and polyacrylonitrile.

In the method of the present invention, the polyamide substrate is contacted with (A) a polysiloxane having carboxy functional groups (—COOH); (B) a polysiloxane having phosphonic acid or phosphonic salt groups (—PO$_3$H$_2$, or alkali metal salts thereof such as —PO$_3^{2-}$—2Na$^+$, —PO$_3$H$^-$Na$^+$, PO$_3^{2-}$—2K$^+$ and PO$_3$ H$^-$K$^+$, depending on the degree of neutralization); (C) a polysiloxane having a combination of carboxy and sulfonate functional groups (—SO$_3$H or alkali metal salts thereof such as SO$_3^-$ Na$^+$ and SO$_3^-$K$^+$); or (D) a mixture of at least two of polysiloxanes (A), (B), and (C).

More particularly, the polysiloxanes having carboxy or phosphonic functional groups are described by Formula I:

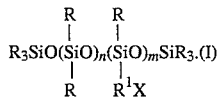

In Formula I, each R is same or different and is a monovalent hydrocarbon radical. Preferably, R is selected from the group consisting of (i) an alkyl having 1 to 4 carbon atoms, (ii) an aryl having six, ten, or fourteen ring carbon atoms, and (iii) an aralkyl having at least seven carbon atoms. Most preferably, R is methyl.

In the above Formula I, R$^1$ is selected from the group consisting of (i) an alkylene group having 1 to 20 carbon atoms, preferably 1 to 15 carbon atoms, and most preferably 1 to 10 carbon atoms; (ii) an arylalkylene or alkarylene group having 7 to 25 carbon atoms, preferably 7 to 15 carbon atoms, and most preferably 7 to 10 carbon atoms; (iii) an alkenylene group having 2 to 20 carbon atoms, preferably 2 to 15 carbon atoms, and most preferably 2 to 10 carbon atoms; and (iv) an organic group selected from one or more of groups (i) through (iii) above and containing a group selected from the group consisting of an ether group, an ester group, a hydroxide group, a keto group and a carboxyl group.

In Formula I, X is carboxy or a phosphonic acid or phosphonic salt functional group.

In the preferred embodiment, R$^1$X has the following structure:

It is believed that the presence of the unsaturation in the molecule provides or aids in curing the finish on the surface of the polyamide substrate.

In Formula I, $\underline{n}$ has a value ranging from 0 to 500, preferably 1 to 250, most preferably 1 to 100. And, $\underline{m}$ has a value ranging from about 1 to 500, preferably about 1 to 100, and most preferably from about 1 to 25. The ratio n/m ranges from about 0 to 15, preferably 2 to 15, and most preferably is about 5 to 10.

The preparation of the anionic carboxy polysiloxanes (A) employed in the method of the present invention is well known in the art and is disclosed, for example, in U.S. Pat. No. 2,957,899, 4,348,452 and 4,777,277. According to the disclosure in U.S. Pat. No. 4,777,277, carboxy polysiloxanes are prepared by reacting a hydroxy-modified polysiloxane with an anhydride to form a corresponding carboxy polysiloxane. Typically the reaction proceeds in a solvent such as toluene or tetrahydrofuran by using 1 to 1.2 moles of the anhydride per 1 mole equivalent of the number of hydroxy groups in the hydroxy-modified polysiloxane in the presence of a catalytic amount of an acid or base. The reaction mixture is refluxed under nitrogen until a constant acid number is obtained as determined by titration with a base.

Polysiloxanes modified with phosphonic ester groups are known in the art and can be prepared for example, from chloroalkyl-modified polysiloxanes and diethyl phosphonate ($HPO_3Et_2$), according to the procedure provided in U.S. Pat. No. 4,677,178. Polysiloxanes of the present invention modified with an anionic phosphonic acid or phosphonic salt groups (B) can be easily obtained from the corresponding esters by hydrolysis. The hydrolysis can be carried out in the presence of base, following generally known procedures such as those set forth in *Introduction to Organic Chemistry*, A. Streitwieser, C. H. Heathcock, Macmillan Publishing Company, New York, 1985, page 780.

The polysiloxane having at least one carboxy group and at least one sulfonate is more particularly represented by Formula II:

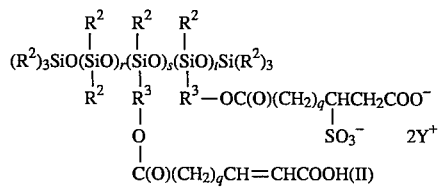

wherein $R^2$ is the same or different and is a monovalent hydrocarbon radical;

$R^3$ is the same or different and is selected from the group consisting of (i) an alkylene group having 1 to 20 carbon atoms, (ii) an alkoxyalkyl group having 4 to 16 carbon atoms, (iii) an aryloxyalkyl group having 7 to 16 carbon atoms;

$\underline{r}$ is a value ranging from about 0 to 500, $\underline{t}$ is at least 1; preferably $\underline{t}$ has a value ranging from 1 to 499;

$\underline{s}$ is at least 1; preferably $\underline{s}$ has a value ranging from 1 to 499; with the proviso that $\underline{s}+\underline{t}$ is not greater than 500;

$\underline{q}$ has a value ranging from 0 to 8, preferably $\underline{q}$ has a value ranging from 0 to 2; most preferably $\underline{q}$ is 0; and $Y^+$ is hydrogen ion or alkali metal ion (such as $Na^+$, $K^+$, $Li^+$, $Cs^+$).

In a preferred embodiment of the method of the present invention, the ratio of $\underline{s}$ to $\underline{t}$ in Formula II is about 10:1 to 1:10.

The preparation of anionic polysiloxanes having carboxy and sulfonate groups (C) is well known in the art and is disclosed, for example, in U.S. Pat. Nos. 4,717,498 and 4,777,277. In general, a polysiloxane having carboxy and sulfonate groups is prepared by the addition of alkali metal sulfite or bisulfite to a carboxy polysiloxane of Formula I wherein $R^1$ comprises an alkenylene group and ester group. Preferably $R^1$ is represented by the following formula:

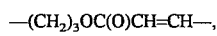

Alkali metal sulfite or bisulfite is dissolved in a minimal amount of water and added to a solution of the carboxy polysiloxane in a solvent. The reaction mixture is heated to 60° C. for 2 to 3 hours or until at least 90% of the alkali metal sulfite or bisulfite employed is consumed as determined by titration with iodine. Depending on the amount of alkali metal sulfite or bisulfite employed in the reaction, the resulting polysiloxane having carboxy and sulfonate groups can be saturated or unsaturated. In a preferred embodiment of the method of the present invention the polysiloxane having both carboxy and sulfonate groups additionally is unsaturated.

While the polysiloxane(s) of the method of the present invention can be used neat, for ease of application, it is usually applied to the polyamide substrate dissolved, dispersed or emulsified to a suitable liquid medium. Preferably, for example, the polysiloxanes in the method of the present invention can be applied to the substrate from an aqueous solution, emulsion or suspension. The polysiloxane(s) may also be applied as a solution in a nonaqueous solvent such as isopropanol or in a liquid in which the modified polysiloxane(s) is miscible such as, for example, toluene. Most preferably, the polysiloxane(s) is applied to the polyamide substrate as an aqueous emulsion.

An aqueous emulsion of the polysiloxane(s) is prepared by blending or mixing the modified polysiloxanes with one or more emulsifiers such as nonionic and anionic surfactants and diluted with water to the desired concentration. Nonionic surfactants commonly employed in such emulsions can include, for example, Tergitol® surfactants available from Union Carbide Chemicals and Plastics Company, Inc. Anionic surfactants used in emulsification can include, for example, SLES® surfactant available from Amerchol. The emulsion of the mixture of at least two of the polysiloxanes (A), (B) and (C) is prepared either (1) by combining separate emulsions of two or more of polysiloxanes (A), (B) and (C) or (2) by mixing or blending two or more of polysiloxanes (A), (B), and (C) emulsifying, and then diluting with water to the desired emulsion concentration. The emulsion of a mixture of at least two or more polysiloxanes (A), (B), and (C) is generally not preferred because of the additional processing steps required to prepare such an emulsion.

In the method of the present invention the anionic polysiloxane emulsion can be diluted with water to a desired polymer level and applied onto the polyamide substrate, such as by spraying, dipping or kiss roll application or other application treatment typically employed in carpet and/or upholstery processing. Indeed, it will be more common to prepare an emulsion at a higher polymer content in order to reduce shipping and/or handling costs and then dilute the emulsion with water immediately prior to use. The polymer content of the anionic polysiloxane emulsion of the present invention ranges from about 1 to 80 percent, preferably about 2 to 50 percent based upon the total weight of the emulsion.

In general, the emulsion is applied to the polyamide substrate such that up to about 6%, preferably about 0.25 to 3% of the anionic modified polysiloxane by weight of the dry substrate remains on the substrate.

Optionally, other additives can be employed along with the anionic polysiloxane of the method of the present invention. Other organic antistains known in the art such as, for example, sulfonated novolak resins; copolymers of maleic anhydride and ethylenically unsaturated monomers; and polymers of methacrylic acid and copolymer of polymethacrylic acid can be employed with the anionic polysiloxane in the method of the present invention. Antisoil additives, such as, for example, perfluorinated polymers and their emulsions, biocides/preservatives, and antioxidants can likewise be included.

The following examples are set forth for illustrative purposes only and are not to be construed as unduly limiting of the present invention. All parts and percentages are by weight unless otherwise specified.

EXAMPLE 1

Preparation of Carboxy Modified Polysiloxane

In accordance with the preparation set forth in U.S. Pat. No. 4,777,277, Polymers I–V were prepared as follows. Solid anhydride was added to a solution of an hydroxypropylpolysiloxane (100 grams) in tetrahydrofuran (60 to 80 milliliters) to form a slurry. A catalyst, p-toluenesulfonic acid (0.1–0.2 grams) was added to the slurry such that the amount of catalyst in the slurry was 0.1% by weight of the combined solution of hydroxypropylpolysiloxane and anhydride. The resulting slurry was stirred and heated to 80° C. in an inert atmosphere of nitrogen until the acid number determined by titration with 0.1N KOH remained constant. The acid number was determined according to the following procedure: Two-gram aliquats of the reaction mixture (sampled every 2 hours) were diluted with 10 milliliters of tetrahydrofuran and the solution was titrated with 0.1N KOH in the presence of phenolophtalein until pink color developed. After the acid number was constant, the solvent was removed under vacuum, and a residue (carboxy-modified polysiloxane and excess anhydride, if any) was pressure filtered to produce the carboxy modified polysiloxane as a clear, viscous fluid. Polymers I–V and their individual components are set forth in Table 1.

EXAMPLE 2

Preparation of Polysiloxanes Having Carboxy and Sulfonic Groups

In accordance with the procedure set forth in U.S. Pat. No. 4,777,277, a 50% solution of Polymers I and II of Example 1 in isopropanol (50 grams) was stirred under an inert atmosphere of nitrogen in a flask equipped with a condenser, addition funnel, and stirrer. A saturated solution of sodium sulfite or sodium bisulfite in a small quantity (5 to 10 milliliters) of distilled water was added slowly. The reaction mixture was then heated to 60° C. until at least 90% of the added salt, as determined by titration with 0.1N solution of iodine, had been consumed.

The titration was conducted according to the following procedure: a one-gram sample of the reaction mixture was diluted with 5 grams of isopropanol, 1 milliliter of 5% potassium iodide solution, and 0.05 grams of Thyodyne (from Fisher Scientific) were added. Thus formed, suspension was titrated with 0.1N solution of iodine until a brown color developed. At least two titrations were carried out for each reaction: initial titration (I) and final titration (II) after 3 hours. If the conversion was lower than 90%, the reaction mixture was heated for an additional 1 hour and titration was repeated.

$$\% \text{ Conversion} = \frac{\text{volume of 0.1N } I_2 \text{ solution used in II titration}}{\text{initial volume of 0.1N } I_2 \text{ solution}} \times 100$$

Removal of the solvent by vacuum, followed by pressure filtration to remove unreacted sulfite, if any, resulted in carboxy/sulfonate modified polysiloxanes (Polymers VI through XII). Polymers VI through XII were clear, viscous fluids which became semi-solid waxes as they cooled to room temperature. The resulting Polymers VI through XII and their components are set forth in Table 2.

TABLE 1

| Polymer No. | Carboxy Modified Polysiloxane | Hydroxypropyl Polysiloxane | Maleic Anhydride | Phthalic Anhydride | Succinic Anhydride |
|---|---|---|---|---|---|
| I | $MD_{50}D^*_{10}M$ | 100 grams | 20 grams | — | — |
| II | $MD_{85}D^*_{7.5}M$ | 100 grams | 10 grams | — | — |
| III | $MD_{150}D^*_{10}M$ | 100 grams | 7.8 grams | — | — |
| IV | $MD_{85}D^{**}_{7.5}M$ | 100 grams | — | 15 grams | — |
| V | $MD_{85}D^{***}_{7.5}M$ | 100 grams | — | — | 10 grams |

$M = O_{1/2}Si(CH_3)_3$
$D = OSi(CH_3)_2$
$D^* = OSi(CH_3)C_3H_6OC(O)CH=CHCOOH$ $D^{**} = $ 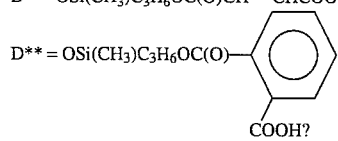

$D^{***} = OSi(CH_3)C_3H_6OC(O)C_2H_4COOH$

TABLE 2

| Polymer No. | Carboxy-Sulfosuccinate Polysiloxane | Carboxy Modified Polysiloxane | Sodium Sulfite | Sodium Bisulfite |
|---|---|---|---|---|
| VI | $MD_{50}D*_{7}D**_{3}M$ | Polymer I (50 grams) | 1.25 grams | — |
| VII | $MD_{50}D*_{5}D**_{5}M$ | Polymer I (50 grams) | 2.5 grams | — |
| VIII | $MD_{85}D*_{5.6}D**_{1.9}M$ | Polymer II (50 grams) | 0.95 grams | — |
| IX | $MD_{85}D*_{3.75}D**_{3.75}M$ | Polymer II (50 grams) | 1.9 grams | — |
| X | $MD_{85}D*_{5.6}D**_{1.9}M$ | Polymer II (50 grams) | — | 1.1 grams |
| XI | $MD_{85}D*_{3.75}D**_{3.75}M$ | Polymer II (50 grams) | — | 2.1 grams |
| XII | $MD_{85}D**_{7.5}M$ | Polymer II (50 grams) | 4.5 grams | — |

$M = O_{1/2}Si(CH_3)_3$
$D = OSi(CH_3)_2$
$D* = OSi(CH_3)C_3H_6OC(O)CH=CHCOOH$
$D** = OSi(CH_3)C_3H_6OC(O)CHCH_2COOH(Na)?$
          |
         $SO_3Na$

EXAMPLE 3

Preparation of Silicone Emulsions

The silicones set forth in Table 1 and 2 were formulated into emulsions. To form an emulsion, 10 grams of the silicone was mixed in a vessel with a 1 gram of SLES® surfactant (an anionic surfactant supplied by Amerchol) to form a premix which is subsequently diluted slowly with 89 parts of water to form a stable emulsion containing 10 parts of the silicone.

EXAMPLE 4

Antistain Properties of the Anionic Polysiloxanes

Polymers I through XII were applied to samples (size 5"×8") of pile floor covering (Nylon 6,6) from a pad bath having a pH of 2.5. The add-on level was adjusted to 2% of the particular Polymer by weight of the sample. The treated samples were dried at 120° C. for 6 minutes or until dry and cured at 140° C. for 2 to 4 minutes. Resistance to staining of the Polymer—treated samples were evaluated in accordance with a modified AATCC Test Method 175–1991. The modifications included replacing the staining solution recommended by the Method with Raspberry Kool-Aid® and contacting carpet samples with the staining solution by dipping the sample pile down into the stain solution instead of using a ring applicator. Evaluation of the amount of discoloration of the stained sample was performed by using a Red Stain Rating Scale© (supplied by AATCC, Triangle Park, N.C.). Polymer treated samples were immersed, pile side down, in a raspberry Kool-Aid staining solution for 24 hours. The stained samples were then rinsed thoroughly with cold running tap water and air dried, stain resistance of the test samples was rated by use of a Red Stain Rating Scale. The results of stain testing are summarized in Table 3. In Table 3, the rating scale ranges from 1 to 10 with a value of I being characterized as severely stained and a value of 10 being characterized as free of stain. A rating of 5 or higher is considered to be acceptable. The results set forth in Table 3 indicated that all anionic silicones exhibited stain resistance under the test conditions. Their performance was related to the level of anionic groups in the molecule.

TABLE 3

Stain Resistance of Anionic Polysiloxanes

| Polymer No | Rating[1] |
|---|---|
| I | 8.0 |
| II | 8.0 |
| III | 4.0 |
| IV | 8.0 |
| V | 7.0 |
| VI | 9.0 |
| VII | 9.0 |
| VIII | 9.0 |
| IX | 7.0 |
| X | 8.0 |
| XI | 8.0 |
| XII | 4.0 |

[1]The rating for an untreated control sample is 1.0.

EXAMPLE 5

Durability of Anionic Polysiloxanes of the Present Invention

Nylon 6,6 carpet samples treated with Polymers I–V, VIII, IX and XII according to the procedure set forth in Example 4 were soaked in a 1% solution of sodium dodecyl sulfate (a surfactant [pH approx. equal to 10] commonly found in rug shampoo formulations) for 5 minutes with occasional stirring.

After rinsing with cold tap water, excess water was removed by squeezing the samples by hand. The samples were dried in an oven at 120° C. for 6 minutes.

The dried samples were stained in accordance with the procedure set forth in Example 4. The stained samples were evaluated as in Example 4. The results are summarized in Table 4.

TABLE 4

Stain Resistance After Surfactant Wash

| Polymer No. | Rating |
|---|---|
| I | 7.0 |
| II | 7.0 |
| III | 4.0 |
| IV | 2.0 |

TABLE 4-continued

Stain Resistance After Surfactant Wash

| Polymer No. | Rating |
|---|---|
| V | 2.0 |
| VIII | 8.0 |
| IX | 7.0 |
| XII | 1.0 |

This example illustrates that while all the polysiloxanes of the method of the present invention impart good stain resistance to a polyamide carpet substrate, polysiloxanes having residual unsaturation in the final structure (Polymers I, II, VIII, and IX) show improved durability to carpet shampooing. It is believed that the presence of the double bonds in the molecule provides or aids in curing the finish on the surface of the polyamide substrate.

Comparative Example A

A polysiloxane as described in U.S. Pat. No. 4,717,498 was prepared and evaluated as follows. Anionic silicone polymer XIII was prepared by reacting 100 g of a copolymer $MD_{13}D"_{5.5}M$, where $D"=OSi(CH_3)C_3H_6O(C_2H_4O)_7H$ with 16.3 g of maleic anhydride as described in Example I. One hundred grams of the water soluble anionic polymer so produced was dissolved in 100 g of water and reacted with 21.2 grams of sodium sulfite at 60° C. for 3 hours to produce a carboxy/sulfonate modified polymer XIV. Chemical structures of Polymers XIII and XIV, respectively, are set forth in Table 5.

Polymer XIV was applied onto the carpet as described in Example IV and tested for stain resistance. The initial rating obtained for the unwashed sample was 2. This result was only slightly better than the untreated nylon (rating of 1.0) and showed that hydrophilic copolymers are not suitable for stain resistant finishing of nylon carpet.

TABLE 5

STRUCTURES

Polymer XIII $(CH_3)_3SiO\left[\begin{array}{c}CH_3 \\ | \\ Si-O \\ | \\ CH_3\end{array}\right]_{13}\left[\begin{array}{c}CH_3 \\ | \\ Si-O \\ | \\ CH_2 \\ | \\ CH_2 \\ | \\ CH_2O(C_2H_4O)_7C(O)CH=CHC(O)OH\end{array}\right]_{5.5}Si(CH_3)_3$ Polymer XIV $(CH_3)_3SiO\left[\begin{array}{c}CH_3 \\ | \\ Si-O \\ | \\ CH_3\end{array}\right]_{13}\left[\begin{array}{c}CH_3 \\ | \\ Si-O \\ | \\ CH_2 \\ | \\ CH_2 \\ | \\ CH_2O(C_2H_4O)_7C(O)CHCH_2C(O)ONa \\ | \\ SO_3Na\end{array}\right]_{5.5}Si(CH_3)_3$

EXAMPLE 6

Preparation and Evaluation of Polysiloxanes Modified with Phosphonic Acid or Salt Groups Copolymer $MD_{85}D^*_{7.5}M$ modified with phosphonic ester groups is prepared in accordance with the procedure set forth in U.S. Pat. No. 4,677,178 from the corresponding chloropropyl analog and diethyl phosphonate. The ester is hydrolyzed in the presence of base such as diluted sodium hydroxide to produce an anionic polysiloxane polymer XV modified with phosphonic salt groups. The approximate structure of Polymer XV is as follows:

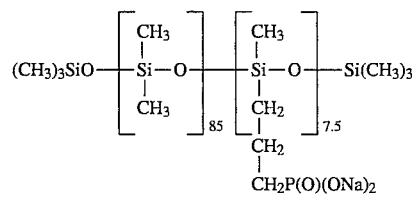

Polymer XV modified with phosphonic salt groups is applied onto the carpet in a similar manner as described in Example 4 and tested for stain resistance.

What is claimed is:

1. A method for imparting stare resistance to a polyamide substrate which method comprises contacting the polyamide substrate with a polysiloxane having the formula:

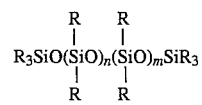

wherein
  each R is the same or different and is a monovalent hydrocarbon radical;
  $R^1$ is selected from the group consisting of (i) an alkylene group having 1 to 20 carbon atoms, (ii) an acylalkylene or alkalylene group having 7 to 25 carbon atoms, (iii) an alkenylene group having 2 to 20 carbon atoms, (iv) an organic group selected from groups (i) through (iii) herein and containing a group selected from the group consisting of an ether group, an ester group, a hydroxide group, a keto group and a carboxyl group;
  wherein if $R^1$ contains an ester group, the polysiloxane is prepared by reacting a hydroxy modified polysiloxane with a cyclic anhydride to form a corresponding carboxy-polysiloxane;
  X is selected from the group consisting of a carboxy group, a phosphonic acid group or a phosphonic salt group;
  $m$ has a value from about 1 to 500;
  $n$ has a value from about 0 to 500;
  the ratio of $n$ to $m$ is from about 0 to 15, in an amount such that 0.25 to 6.0 percent of polysiloxane by weight of the dry substrate remains on the substrate.

2. The method according to claim 1 wherein R is selected from the group consisting of (i) an alkyl group having 1 to 4 carbon atoms, (ii) an aryl group having six, ten or fourteen carbon atoms, and (iii) an aralkyl group having at least seven carbon atoms.

3. The method of claim 2, wherein R is a methyl group.

4. The method of claim 1 wherein $R^1X$ is

* * * * *